US005758180A

United States Patent [19]

Duffy et al.

[11] Patent Number: 5,758,180
[45] Date of Patent: May 26, 1998

[54] BLOCK RESIZING FUNCTION FOR MULTI-MEDIA EDITING WHICH MOVES OTHER BLOCKS IN RESPONSE TO THE RESIZE ONLY AS NECESSARY

[75] Inventors: Robert Duffy, Milpitas; Nancy Craighill, Sunnyvale, both of Calif.; Darin Fong, New York, N.Y.; Robert Berger, Menlo Park, Calif.

[73] Assignees: Sony Corporation, Tokyo, Japan; Sony Electronics, Inc., Park Ridge, N.J.

[21] Appl. No.: 47,828

[22] Filed: Apr. 15, 1993

(Under 37 CFR 1.47)

[51] Int. Cl.$^6$ ........................... G06C 3/00
[52] U.S. Cl. ............ 395/806; 395/807; 395/328
[58] Field of Search ................... 395/154, 152, 395/155, 159, 161, 806, 807, 173, 174, 175, 328, 348; 345/145

[56] References Cited

U.S. PATENT DOCUMENTS

| | | | |
|---|---|---|---|
| 3,364,306 | 1/1968 | Brown | 360/14.1 |
| 4,161,001 | 7/1979 | Sakamoto | 360/10.3 |
| 4,428,001 | 1/1984 | Yamamura et al. | 358/335 |
| 4,538,188 | 8/1985 | Barker et al. | 360/14.3 |
| 4,549,173 | 10/1985 | Nakamura | 345/123 |
| 4,685,003 | 8/1987 | Westland | 360/14.1 |
| 4,729,044 | 3/1988 | Kiesel | 360/14.3 |
| 4,937,685 | 6/1990 | Barker et al. | 360/14.1 |
| 4,939,594 | 7/1990 | Moxon et al. | 360/14.1 |

(List continued on next page.)

FOREIGN PATENT DOCUMENTS

| | | |
|---|---|---|
| 0239884 | 10/1987 | European Pat. Off. . |
| 0 322 100 | 11/1988 | European Pat. Off. . |
| 0 390 048 | 3/1990 | European Pat. Off. . |
| 0 526 064 A2 | 7/1992 | European Pat. Off. . |
| 2 630 572 | 4/1988 | France . |
| 55-75380 | 6/1980 | Japan . |
| 56-154885 | 11/1981 | Japan . |
| WO 93/21583 | 10/1993 | WIPO . |
| WO 93/21636 | 10/1993 | WIPO . |

OTHER PUBLICATIONS

MacroMind MidaMaker, *Users Guide*, MacroMind, Inc. & the Multimedia Corporation Ltd., 1990, pp. 24–25, 137–169.

4,533,910, Graphics Display System with Viewpoints of Arbitrary Location and Content, 340/721.

4,812,834, Graphics Display System with Arbitrary Overlapping Viewpoints, 340/721.

(List continued on next page.)

*Primary Examiner*—Mark K. Zimmerman
*Assistant Examiner*—Stephen Hong
*Attorney, Agent, or Firm*—Blakely, Sokoloff, Taylor & Zafman

[57] ABSTRACT

A computer controlled video re-editing system with a "Domino" re-edit function. An edited video comprises a set of ordered video segments. In a video re-editing system a user can re-edit an edited video by adjusting the duration of each video segment. When a user adjusts the length of a video segment, the Domino re-edit function examines how the re-edit to the edited video work affects nearby video segments in the edited video work. The Domino re-edit function then propagates the effects of a re-edit by moving the nearby video segments forward or backward along a time line to accommodate the re-edit made. The Domino re-edit function utilizes any empty spaces that exist in an edited video work such that the empty spaces are filled before the effects of a re-edit are propagated to another video segment. If there is sufficient empty space between video segments, the effects of the re-edit cease propagating. To prevent a video segment from being moved by the Domino re-edit function, a user can "lock" the video segment to a reference time line. To preserve a relative relationship between two video segments, a user can lock the two video segments together.

18 Claims, 15 Drawing Sheets

U.S. PATENT DOCUMENTS

| | | | |
|---|---|---|---|
| 4,943,866 | 7/1990 | Barker et al. | 358/335 |
| 4,949,193 | 8/1990 | Kiesel | 360/14.1 |
| 4,964,004 | 10/1990 | Barker | 360/14.1 |
| 4,979,050 | 12/1990 | Westland et al. | 360/14.1 |
| 5,012,334 | 4/1991 | Etra | 348/107 |
| 5,307,456 | 4/1994 | Mackay | 395/154 |
| 5,339,393 | 8/1994 | Duffy et al. | 395/161 |
| 5,428,774 | 1/1995 | Takahashi et al. | 395/600 |
| 5,440,677 | 8/1995 | Case et al. | 395/154 |

OTHER PUBLICATIONS 4,939,507, Virtual and Emulated Objects for Use in the User Interface of a Display Screen of a Display Processor, 340/706.

5,062,060, Computer Interface Comprising User–Adjustable Window for Displaying or Printing Information.

4,722,882, Cursor Controller User Interface System, 340/709.

Re. 32,632, Display System, 340/709.

4,555,775, Dynamic Generation and Overlaying of Graphic Windows for Multiple Active Program Storage Areas, 364/900.

4,622,545, Method and Apparatus for Image Compression and Manipulation, 340/747.

4,748,618, Telecommunications Interface, 370/94.

4,785,408, Method and Apparatus for Generating Computer–Controlled Interactive Voice Services, 364/513.5.

4,847,604, Method and Apparatus for Identifying Features of an Image on a Video Display, 340/706.

4,884,223, Dynamic Force Measurement System, 364/550.

4,899,136, Data Processor Having a User Interface Display with Metaphoric Objects, 340/706.

4,914,732, Electronic Keye with Interactive Graphic User Interface, 340/825.

4,931,783, Method and Apparatus for Removable Menu Window, 340/710.

4,935,865, Computer Controlled Electropolishing System, 364/188.

5,072,412, User Interface with Multiple Workspaces for Sharig Display System Objects, 395/159.

5,155,806, Method and Apparatus for Displaying Context Sensitive Help Information on a Display, 395/157.

5,157,768, Method and Apparatus for Displaying Context Sensitive Help Information on a Display, 395/157.

5,008,853, Representation of Collaborative Multi–User Activities Relative to Shared Structured Data Objects in a Networked Workstation Environment, 364/900.

4,538,188, Video Composition Method & Apparatus, 360/14.3.

4,937,685, Method of Display Presentation for Video Editing, 360/14.1.

4,949,193, Video Composition Method Employing Action Scrolling, 360/14.1.

4,939,594, Method & Apparatus for Improved Storage Addressing of Video Source Material, 360/14.1.

4,964,004, Video Composition Method & Apparatus Employing Visual and Tactile Feedback, 360/14.1.

4,979,050, Video Composition Method for Assembling Video Segments, 360/14.1.

4,729,044, Method & Apparatus for Playing Serially Stored Segments in an Arbitrary Sequence, 360/14.3.

4,943,866, Video Composition Method & Apparatus Employing Smooth Scrolling, 358/335.

4,746,994, Computer–Based Video Editing System, 360/13.

4,685,003, Video Composition Method & Apparatus for Providing Simultaneous Inputting and Sorting of Video Source Material, 360/14.1.

Hiroshi Ishii, Kazuho Arita, Clearface: Translucent Multiuser Interface for TeamWorkStation, *ECSCW*, Sep. 1991, pp. 6–10.

Hiroshi Ishii, Naomi Miayaka, Toward an Open Shared Workspace, *COMMUNICATIONS OF THE ACM*, Dec., 1991, vol. 34, No. 12, pp. 37–50.

Article entitled: Learning Considerations In User Interface Design: The Room Model; author: Patrick P. Chan; publication of the Software Portability Laboratory, University of Waterloo, Waterloo, Ontario, Canada, Jul., 1984.

Article entitled: Creation/Modification of the Audio Signal Processor Setup For a PC Audio Editor; publication of International Business Machiens, IBM Technical Disclosure Bulletin, vol. 30, No. 10, Mar. 1988.

Article entitled: Browsing Within Time–Driven Multimedia Documents, authors: Stavros Christodoulakis and Steven Graham; publication of the Institute for Computer Research, University of Waterloo, Waterloo, Ontario, Canada, Jul., 1988.

Article entitled: Impact: An Interactive Natural–Motion–Picture Dedicated Multi–Media Authoring System; authors: Hirotada Ueda, Takafumi Mityatake, and Satoshi Yoshizawa; Communications of the ACM, Mar., 1991, pp. 343–350.

Leanne Ryan, "Editing the Montage Way", pp. 164–165 *On Location*, Jun. 1984.

Michael Mills, Media Composition for Casual Users, 1991 IEEE.

P. Venkat Rangan, Software Implementation of VCRs on Personal Computing Systems, *IEEE Transactions on Consumer Electronics*, vol. 38, No. 3, Aug. 1992.

IBM Technical Disclosure Bulletin: Digital Video Editor, vol. 35, No. 2, Jul. 1992.

Jeffrey J. Blatt, A Primer on User Interface Software Patents, The Computer Lawyer, Apr. 1992, vol. 9, No. 4, 1–6.

BLOCK RESIZING FUNCTION FOR MULTIMEDIA EDITING WHICH MOVES OTHER BLOCKS IN RESPONSE TO THE RESIZE ONLY AS NECESSARY

BACKGROUND OF THE INVENTION

1. Field of the Invention

The present invention relates to apparatus and methods for editing video and audio information, and more particularly, the present invention relates to a computer controlled re-editing system which fills in gaps in a media time line when a re-edit is made.

2. Art Background

Video editing combines video source material from a number of different video sources into a single video work. After the editing process, an edited video work comprises an ordered collection of video blocks from the different video sources. Each video block comprises an "in" point which marks where the video block begins and an or "out" point which designates where the video block ends.

Edited video works are then usually "re-edited" to further refine the edited video work. During the re-editing process the existing collection of video blocks may be moved around. Furthermore, the in and out points of each video block may be moved forward (ascending in time) or backward (descending in time). Keeping track of and adjusting all the in and out points of the video blocks during the re-edit process is a computationally intensive task. Consequently, computer controlled video re-editing systems have been developed. The computer controlled video re-editing system manages the task of adjusting the in and out points which define the video blocks as a user re-edits an edited video work.

One problem associated with existing computer controlled video re-editing systems is that the re-editing systems only adjust the video block in and out points after re-edits in one of two simple ways. The existing re-editing systems either affect only the single video block being re-edited or propagate the effects of the re-edit to every subsequent video block. Such all or nothing re-edit systems lack the flexibility needed for today's heavily edited video productions. As will be described, the present invention provides a method and apparatus for re-editing video such that a re-edit to a video block only affects the nearby video blocks as necessary to accommodate the re-edit.

SUMMARY OF THE INVENTION

It is therefore an object of the present invention to provide a computer controlled re-edit system with more flexible re-edit operations. Specifically, the present invention implements a "Domino" re-edit function that adjusts only the nearby video blocks as necessary to accommodate a re-edit.

The Domino re-edit function of the present invention first examines the video blocks which are immediately affected by a re-edit made to an edited video work. The Domino re-edit function then propagates the effects of a re-edit by moving the nearby video blocks forward or backward along a time line to accommodate the re-edit made. The Domino re-edit function utilizes any empty spaces that exist in an edited video work such that the empty spaces are filled before the effects of a re-edit are propagated to another video block. If there is sufficient empty space between video blocks, the effects of the re-edit cease propagating. To prevent a video block from being moved by the Domino re-edit function, a user can "lock" the video block to a reference time line.

The Domino re-edit function of the present invention is implemented on a computer controlled re-editing system. The computer controlled re-editing system comprises at least one central processing unit (CPU) is coupled through appropriate input/output (I/O) circuitry to input devices, such as a cursor control device. The CPU is further coupled to a storage device for the storage of programs and data including a database storing information about all the source video material. The CPU is also coupled to a display device on which a graphical user interface is displayed.

BRIEF DESCRIPTION OF THE DRAWINGS

The objects, features, and advantages of the present invention will be apparent from the following detailed description of the preferred embodiment of the invention with references to the drawings in which.

NOTATION AND NOMENCLATURE

Figure 1:
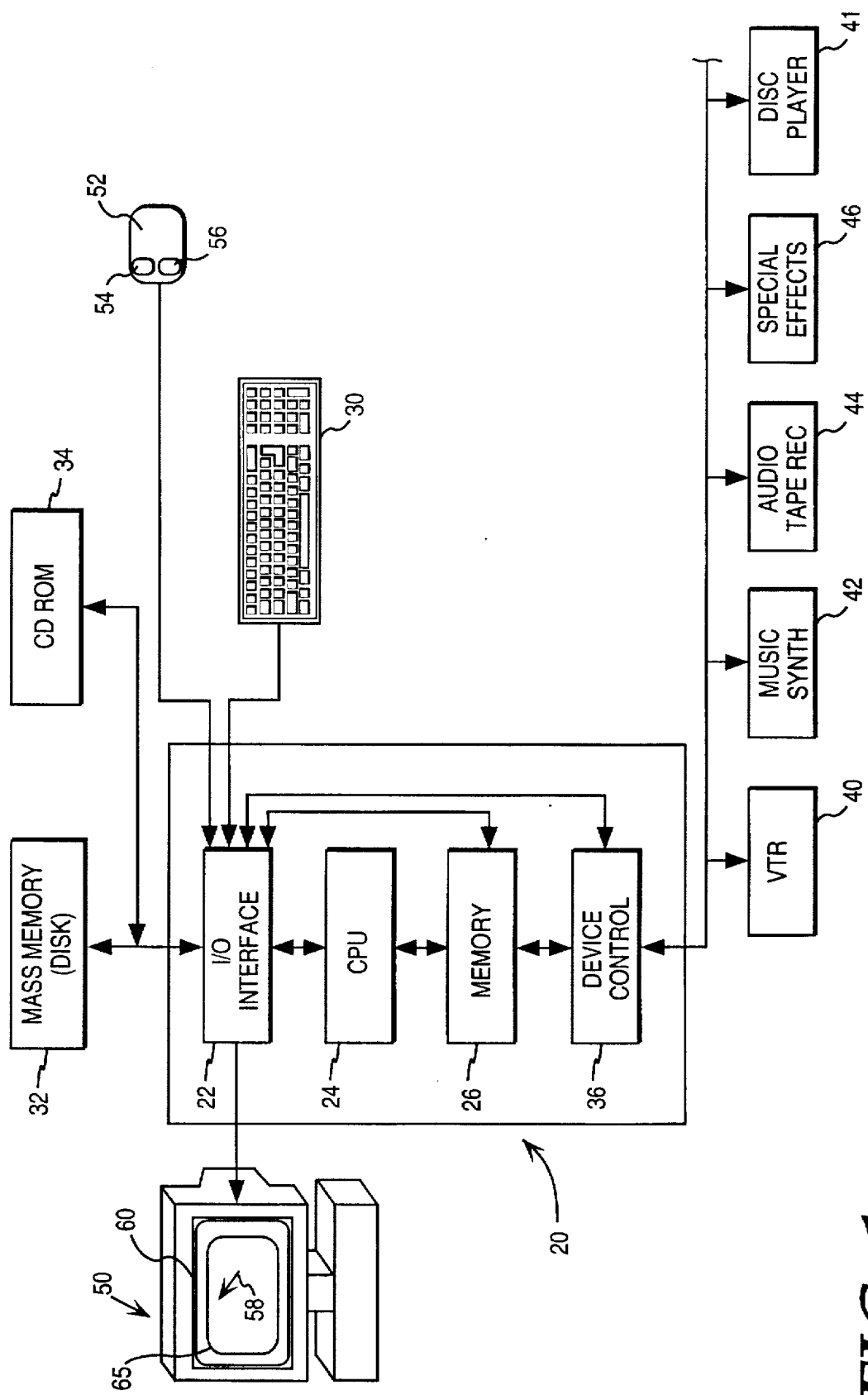
FIG. 1 is a functional block diagram illustrating one possible computer display system incorporating the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by Sony Corporation of America, as well as other manufacturers of computer systems.

DETAILED DESCRIPTION OF THE INVENTION

The present invention discloses apparatus and methods for a computer controlled editing system that has a re-edit function with bidirectional rippling. In the following description, numerous specific details are set forth such as computer system configurations, window elements, icons, desktop sizes, metaphors, window configurations and arrangements, etc. in order to provide a thorough understanding of the present invention. However, it will be apparent to one skilled in the art that the present invention may be practiced without these specific details. In other instances, well known circuits, structures and the like are not described in detail so as not to obscure the present invention unnecessarily.

Hardware Configuration

Referring now to FIG. 1, the hardware configuration of the computer controlled re-edit system of the present invention is illustrated in block diagram form. The figure illustrates a computer system for generating a window-based graphic user interface coupled to control hardware for controlling resources that store source material. As illustrated, the re-edit system includes a computer 20 which comprises four major components. The first of these is an input/output (I/O) circuit 22, which is used to communicate information in appropriately structured form to and from other portions of the computer 20. In addition, computer 20 includes a central processing unit (CPU) 24 coupled to the I/O circuit 22 and to a memory 26. These elements are those typically found in most computers and, in fact, computer 20 is intended to be representative of a broad category of data processing devices.

As illustrated in FIG. 1 a keyboard 30 is coupled to computer 20 through the I/O circuit 22 for inputting data and commands, as is well known in the art. Also coupled to the I/O circuit 22 is a mass memory system 32 for storing programs and data. Similarly, a CD ROM 34 is coupled to the I/O circuit 22 for providing additional data storage capacity to the system illustrated in FIG. 1. It will be appreciated that other common computer peripherals may be coupled to the computer 20 such as magnetic tape drives and a computer network interface.

A device control interface 36 is coupled to both the memory 26 and the I/O circuit 22, to permit the computer 20 to communicate with and control media resources. For example, in a video editing environment, the computer 20 may be coupled to a video tape recorder 40, a music synthesizer 42, an audio tape recorder 44, and a special effects resource 46, as shown in FIG. 1.

A display monitor 50 is coupled to the computer 20 through the I/O circuit 22. Any well known variety of cathode ray tube (CRT), liquid crystal or other displays may be utilized as display 50. A cursor control device 52 includes switches 54 and 56 for signaling the CPU 24 in accordance with the teachings of the present invention. Cursor control device 52 (commonly referred to as a "mouse") permits a user to select various command modes, modify graphic data, and input other data utilizing switches 56 and 54. More particularly, the cursor control device 52 permits a user to selectively position a cursor 58 at any desired location on a display screen 60 of the display 50. As illustrated in FIG. 1, the cursor 58 is disposed with a window 65 in the present invention's graphic user interface, to be described more fully below. Moreover, in the presently preferred embodiment, the present invention's window-based user interface is generated and displayed using software stored in either memories 26, 32 or CD ROM 34, and executed by the CPU 24.

In the presently preferred embodiment, cursor control 52 utilizes well known apparatus and methods for signaling CPU 24 of positional changes of cursor 58 by movement of the cursor control over a surface. However, it will be appreciated by one skilled in the art that a variety of well known cursor control devices may be utilized by the present invention, including other control devices such as mechanical mice, trackballs, joy sticks, graphic tablets, other keyboard inputs and the like. The cursor control 52 in FIG. 1 is intended to encompass all such equivalent devices.

Video Editing

The first step in the video editing process is to catalog all of the source material that has been created such that a database of the available source material is created. For example, a computer controlled editing system may provide a means for a user of the computer controlled editing system to generate source logs. The source logs comprise selected portions of audio and/or video generated from the various media resources. Each source log comprises information such as a tape identifier, a start point, and end point, and any other useful information that will be used during the editing and re-editing processes. The source logs define the source material for use in the computer controlled editing system that allows a user to select the source material for editing or re-editing of a production. To create a source log, a user may select a media resource, such as a video tape player, and command the computer controlled editing system to capture a selected portion of the video generated by the video tape player. The selected portion of the video captured constitutes a source log.

The source log generated may comprise video and/or any number of audio channels. The plurality of source logs generated for editing of a particular multi-media production may be arranged into a file such that the file contains source logs for the editing or re-editing of that particular production. As will be described more fully below, the new Domino re-editing function of the present invention operates in conjunction with the source material database comprising source logs. Although the present invention is described in conjunction with a computer controlled editing system that generates source logs, any database comprising source material for use in a computer controlled editing system could be used in accordance with the teachings of the present invention.

Figure 2:
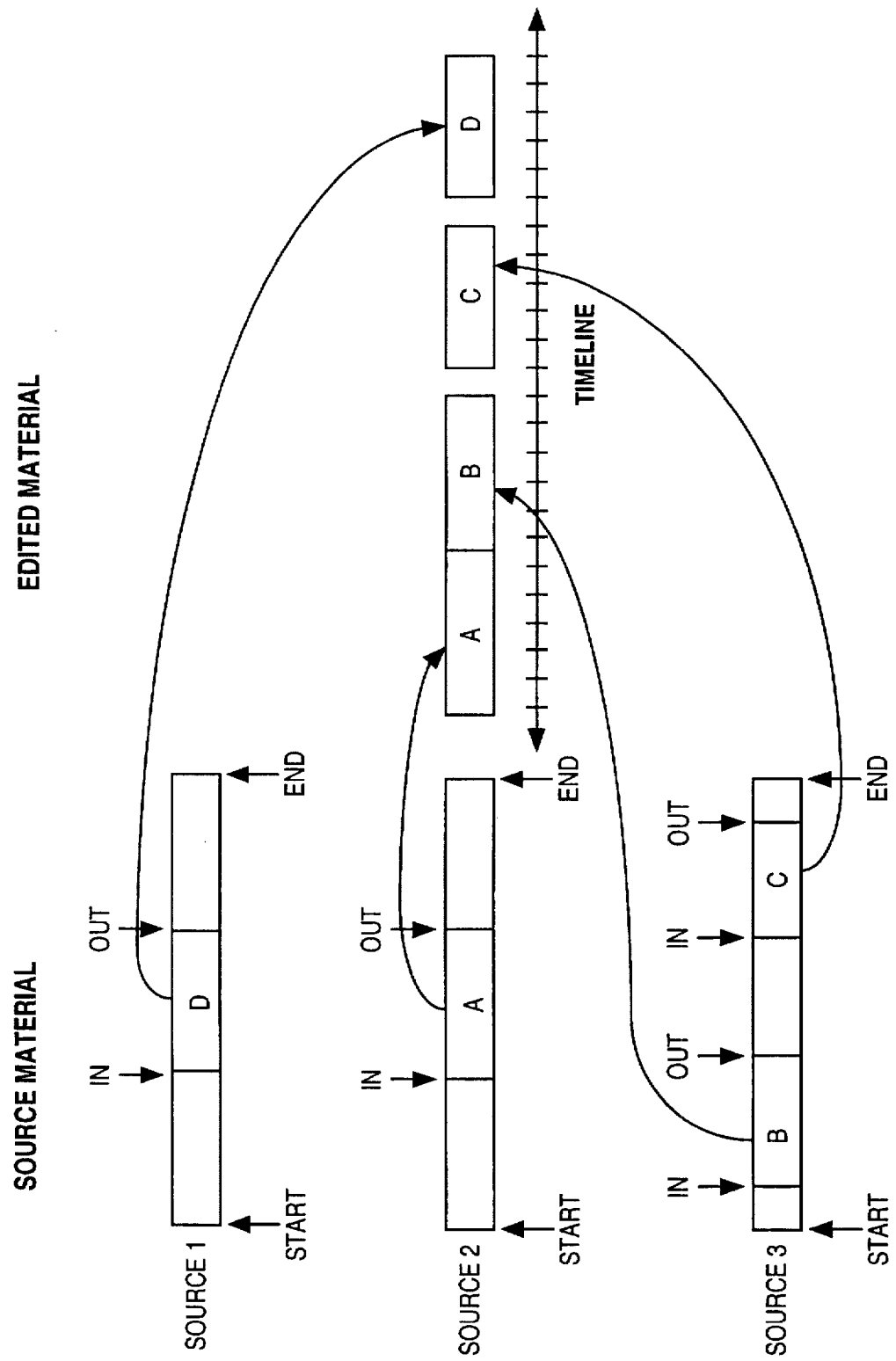
FIG. 2 is a conceptual diagram of video sources and an edited video made from the video sources.

FIG. 2 illustrates video source material being used to construct an edited video. On the left side of FIG. 2 there are three sections of video source material. Each section of video source material has a start point and an end point. Between the start point and end point are a plurality of video frames. The video source material is cataloged into a database as described above such that the database contains a tape identifier, a start point, an end point, and other useful information that will be used during the editing and re-editing processes.

To edit the video source material, an operator using a computer controlled editing system builds a list of in and out points which represent subsections of the video available in the video source material. Each in point and out point pair defines a video block such as video blocks A, B, C, and D. After the editing process a the final product is the collection of ordered video blocks as illustrated on the right side of FIG. 2. The ordered video blocks are laid out along a time line that provides a time reference.

Referring to FIG. 2, gaps exists between some of the video blocks in the edited video work. Specifically, there are empty spaces between video blocks B and C and between video blocks C and D. These empty spaces represent time where there is no video output. The empty spaces are often called "implicit black" since empty black video frames will be output during those times unless the empty spaces are eventually filled with other video source material.

Although FIG. 2 illustrates only a single track, an editing system can operate on multiple tracks such that the final work comprises any number of different media tracks. Currently, most editing systems operate on a single video track with two accompanying audio tracks. For simplicity, this Specification will usually only discuss operations on a single track. However, the present invention is meant to be used in re-editing systems that operate on multiple tracks.

Prior Art Re-Editing

Re-editing consists of the process of further refining an edited video work. During the re-editing process the existing collection of video blocks may be moved around. Furthermore, the in and out points defining each video block may be adjusted by being moved forward (ascending in time) or moved backward (descending in time).

Figure 3A:
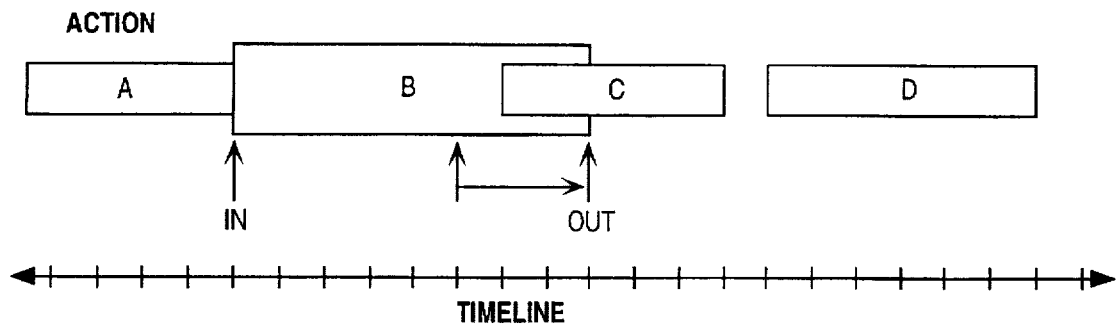
FIG. 3a illustrates a typical re-edit on an edited video where the out point of a video block is moved forward in time.

For example, FIG. 3a illustrates a simple re-edit of the edited video illustrated in FIG. 2. In the re-edit illustrated in FIG. 3a, the out point of video block B has been moved forward in time thereby extending the duration of video block B. As graphically illustrated in FIG. 3a, the out point of video block B extends past the in point of video block C. The extension creates an inconsistent time line in the edited video since video blocks B and C overlap. Therefore the re-editing system must somehow reconcile the re-edit made to video block B in order to maintain a consistent time line.

Prior art re-editing systems are severely limited in the ways such systems can reconcile re-edits that create inconsistent time lines. Generally, prior art re-editing systems reconcile inconsistent time lines only in one of two ways. A first method of reconciling the time line is to modify only the in or out point of the adjacent video block. Alternatively, prior art re-edit systems reconcile inconsistent time lines by modifying every subsequent video block such that the re-edit affects all the video blocks located after the re-edited video block.

Figure 3B:
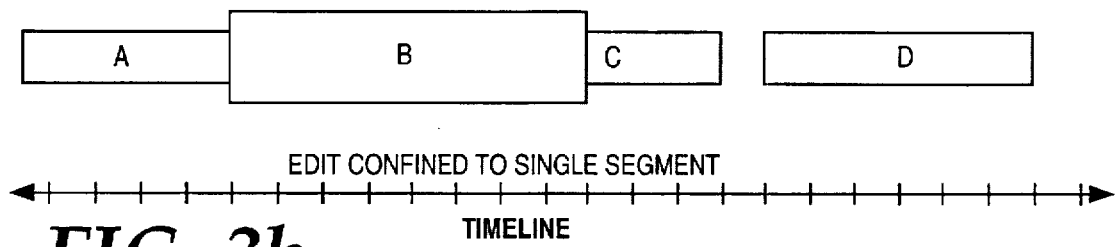
FIG. 3b illustrates the reconciliation of the re-edit illustrated in FIG. 3a by a prior art re-edit system configured to confine the re-edit to the re-edited video block and the affected video block.

Examining the first method, when the re-edit illustrated in FIG. 3a is reconciled by a prior art re-edit system configured to modify only the adjacent in or out point, then only the in point of video block C is modified. FIG. 3b illustrates the edited video time line after the in point of video block C is modified. In FIG. 3b the in point of video block C has been moved forward in time such that video block B no longer overlaps video block C. This method has the disadvantage of shortening the duration video block C as illustrated in FIG. 3b.

Figure 3C:
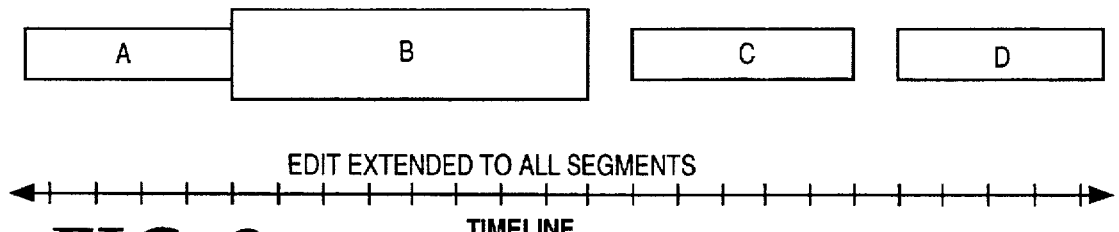
FIG. 3c illustrates the reconciliation of the re-edit illustrated in FIG. 3a by a prior art re-edit system configured to propagate the re-edit to all the video blocks in the edited video.

In the second method, when the re-edit illustrated in FIG. 3a is reconciled by a prior art re-edit system that is configured to modify every subsequent video block, all the video blocks located after video block B must be moved back in the same manner as the out point for video block B. FIG. 3c illustrates the edited video time line after every video block after video block B has been moved back.

As illustrated graphically in FIGS. 3b and 3c, prior art re-edit systems do not recognize or utilize the empty spaces between video blocks. In many situations it is be desirable to have a more flexible re-editing system that would use these empty spaces. Therefore the present invention creates a number of different ways of handling re-edits.

The Domino Re-Edit Function

The present invention introduces a new type of re-edit function entitled the "Domino" re-edit. A Domino re-edit is performed when a user wishes to extend a video block and move over all the subsequent video blocks only as necessary to make room for the extension. Since the Domino re-edit moves video blocks only as necessary, the Domino re-edit differs from the prior re-edit propagation of FIG. 3c since the Domino re-edit fills in empty spaces available in the edited video time line. Thus a Domino re-edit is conceptually similar to a series of dominoes standing on end which knock over the adjacent domino unless there is sufficient space between the dominoes.

Figure 4A:
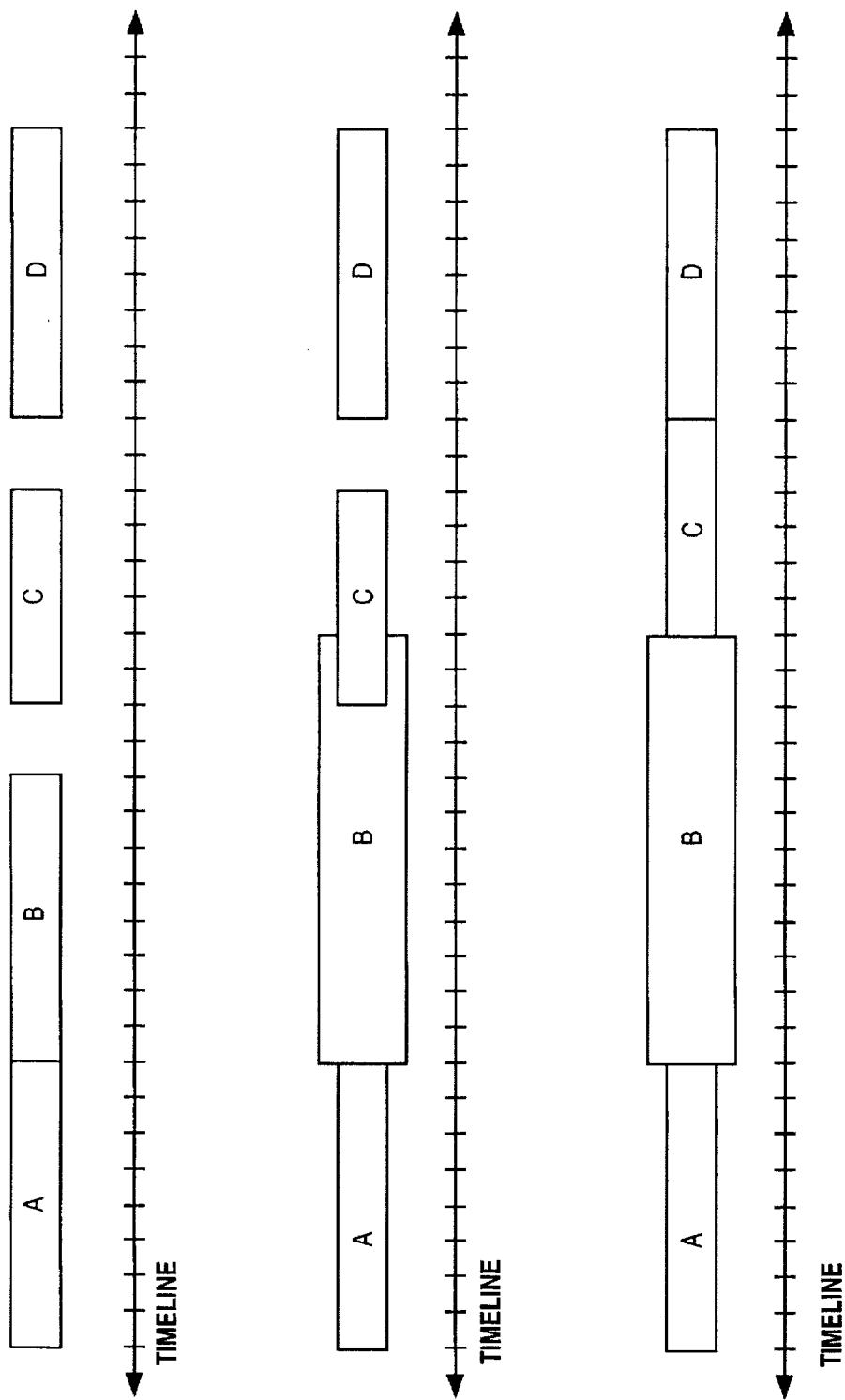
FIG. 4a illustrates the reconciliation of the re-edit illustrated in FIG. 3a by the Domino function which moves the affected video blocks only as necessary.

For example, referring to FIG. 4a, a Domino re-edit is illustrated. The first video time line of FIG. 4a illustrates the edited video from FIG. 2. The second video time line of FIG. 4a illustrates the re-edit made in FIG. 3a. The third video time line of FIG. 4a illustrates how the Domino re-edit reconciles the inconsistent time line created by the re-edit in the second video time line. In the third video time line of FIG. 4a, video block C has moved over to the right filling in the gap that previously existed between video block C and video block D. Since there was enough empty space in the gaps between the video blocks, video block D was unaffected by the re-edit.

Figure 4B:
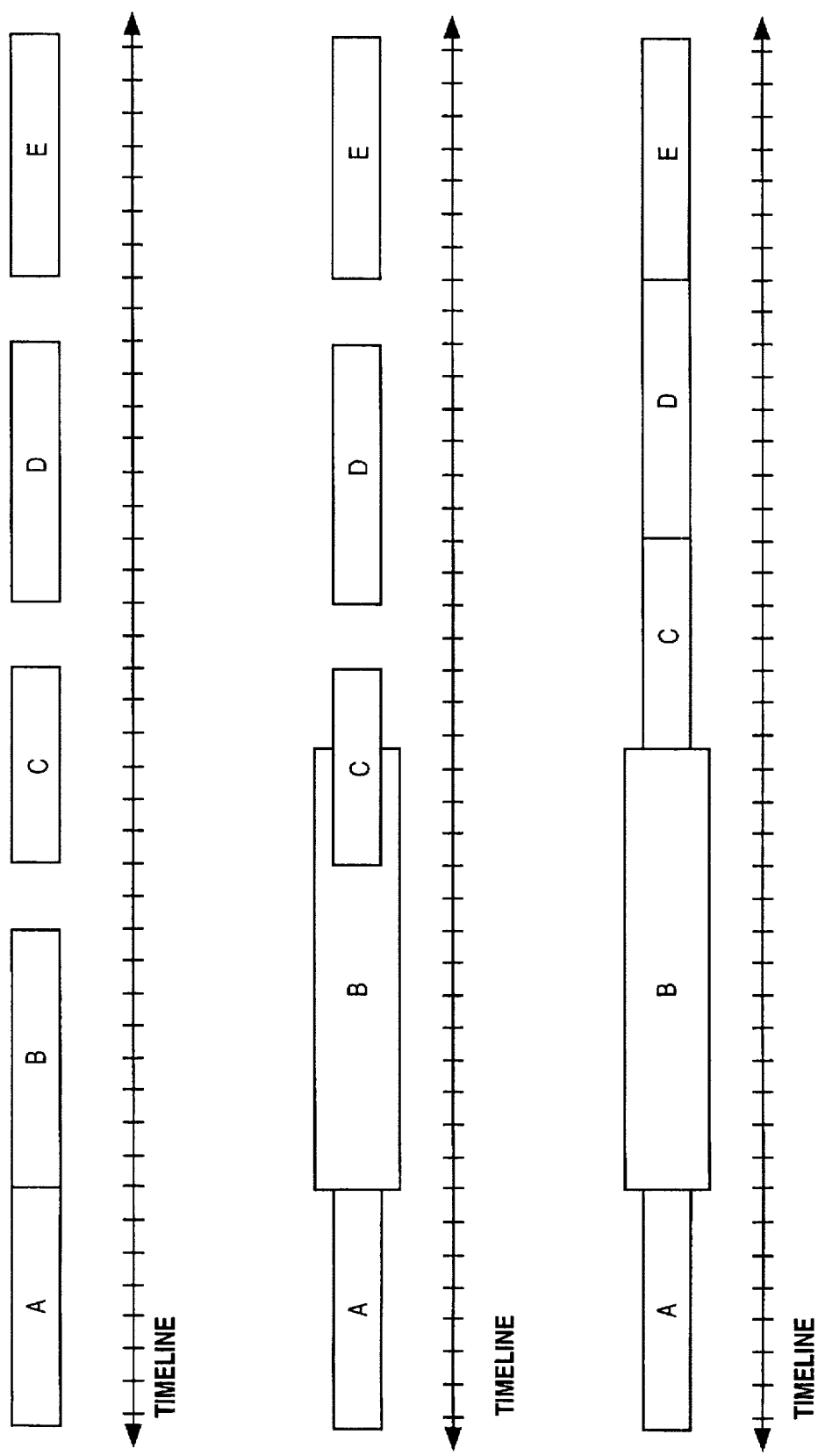
FIG. 4b illustrates the reconciliation of a re-edit by rippling the re-edit to subsequent video blocks as necessary.

FIG. 4b illustrates a Domino re-edit that "ripples" the re-edit to other video blocks. The first video time line of FIG. 4b illustrates the edited video from FIG. 2 with a fifth video block added. The second video time line of FIG. 4b illustrates a re-edit where the out point of video block B extends well into video block C. The bottom video time line of FIG. 4b illustrates how the Domino re-edit reconciles the inconsistent time line created by the re-edit in the second video time line. In the bottom video time line of FIG. 4a, video block C has moved over to the right covering the gap that previously existed between video block C and video block D. Since there was not enough empty space in the gaps between video blocks C and D, the system also had to ripple the re-edit to video blocks D and E by moving video blocks D and E forward in time.

Thus the Domino re-edit function of the present invention utilizes the empty spaces between video blocks when a re-edit is performed. The Domino re-edit function ripples the effects of a re-edit to other video blocks only when there are not enough empty spaces between the video blocks to accommodate the re-edit.

Domino Re-Edit Isolated to Contiguous Segment

In some situations, a user of a re-edit system may wish to confine the affects of a re-edit to a particular contiguous segment. For example, if the user is re-editing only one particular scene in a video program, the user may want other scenes of the program to remain unaffected by the re-edits. To accommodate this situation, the present invention provides a mode where the user can specify that the re-edits only affect a contiguous set of video blocks.

Figure 5A:
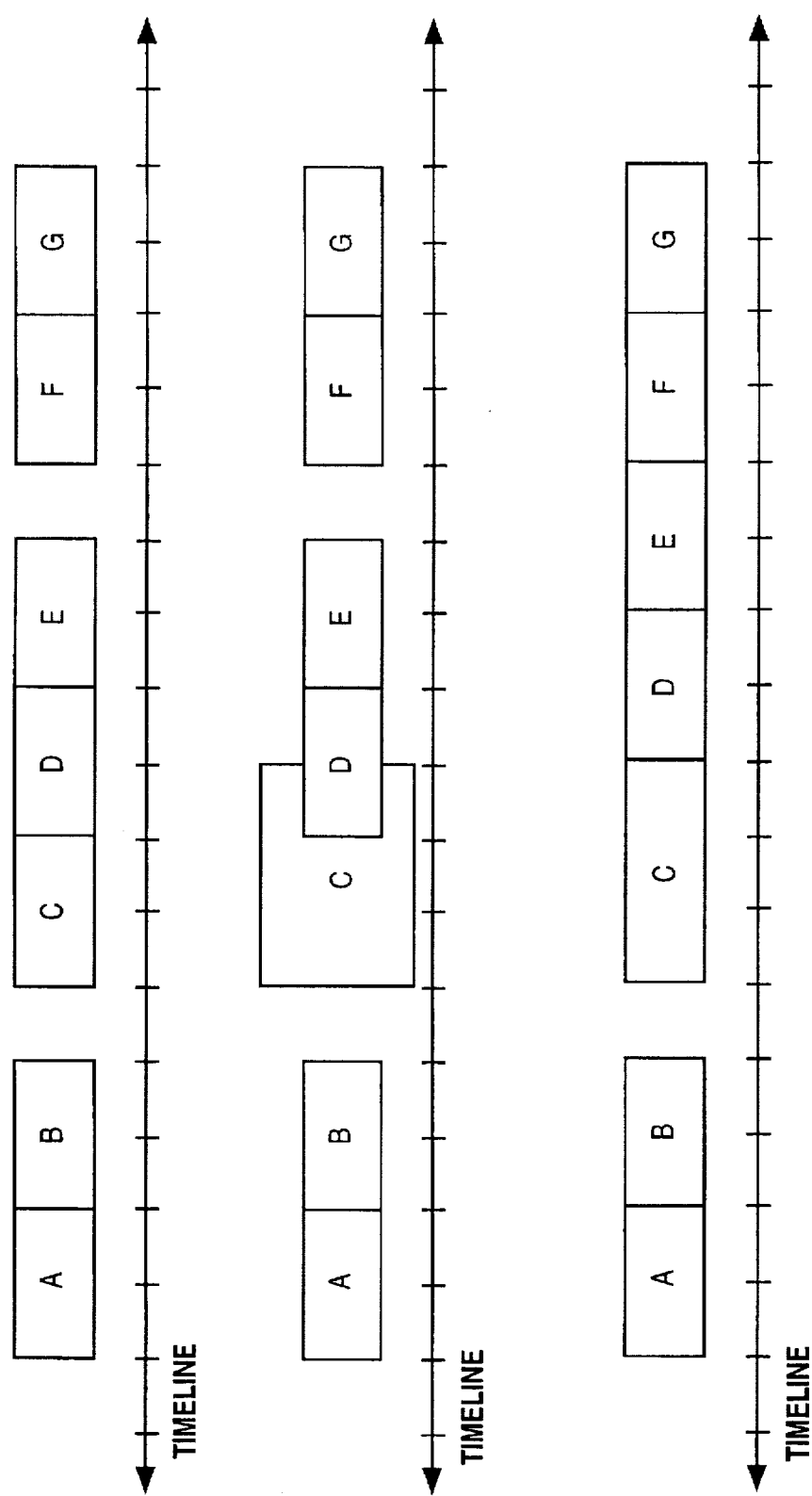
FIG. 5a illustrates the reconciliation of a re-edit by the Domino function when a user has requested the effects be confined to a contiguous set of video blocks.

FIG. 5a illustrates a first example of a re-edit confined to a contiguous set of video blocks. The first video time line illustrated in FIG. 5a has three different sets of contiguous video blocks. On the second video time line illustrated in FIG. 5a the out point of video block C in the second contiguous video block has been extended past the in point of video block D also in the second contiguous video block. The third video time line of FIG. 5a illustrates how the Domino re-edit reconciles the inconsistent time line created by the re-edit in the second video time line. In the third video time line of FIG. 5a, video blocks D and E are moved over to the right. Since there was enough empty space between the second contiguous video block and the third contiguous video block, only the second set of contiguous video blocks was affected.

Figure 5B:
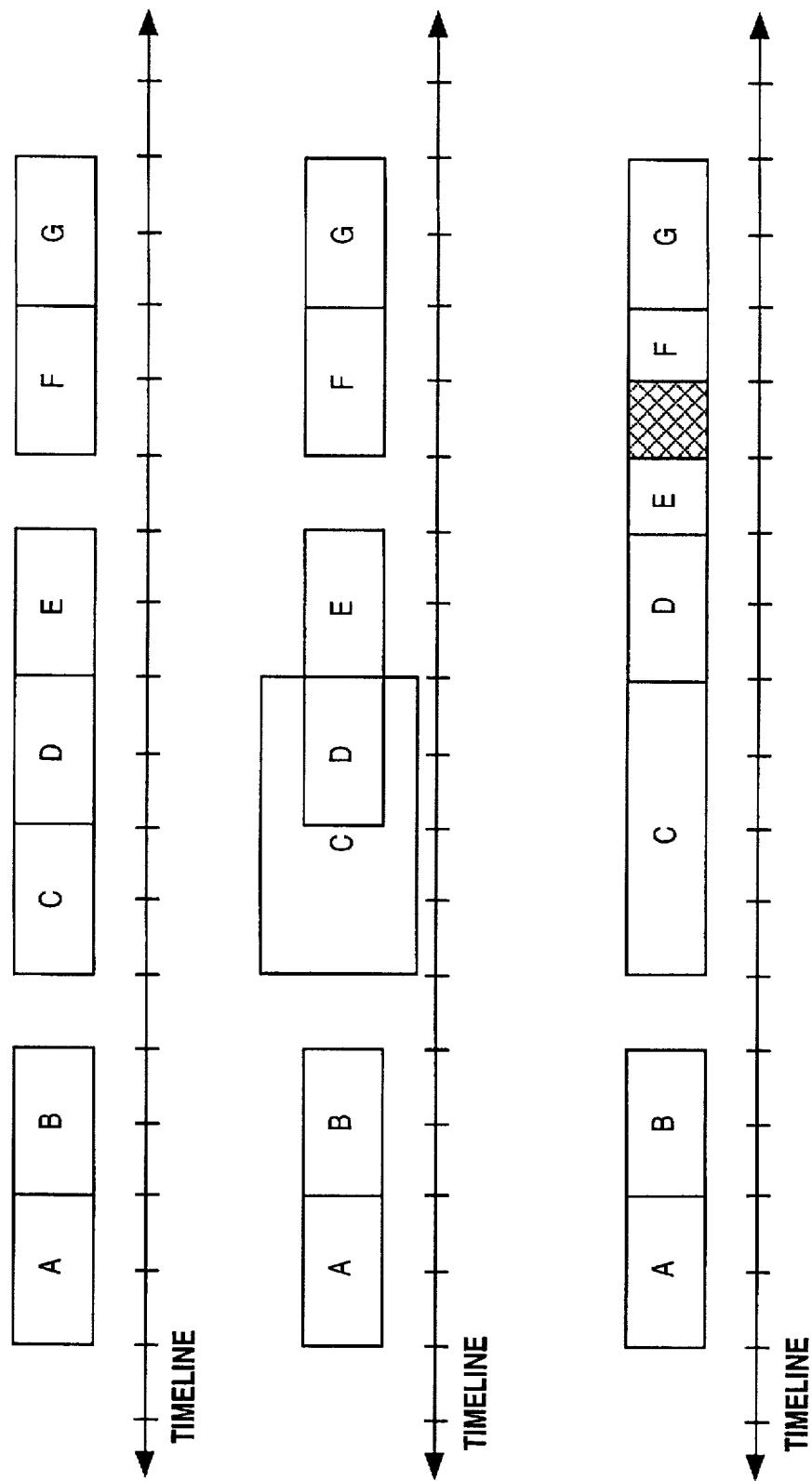
FIG. 5b illustrates the reconciliation of a re-edit by the Domino function when a user has requested the effects of the re-edit be confined to a contiguous set of video blocks but the re-edit requires more space than is available.

FIG. 5b illustrates a second example of a re-edit confined to a contiguous set of video blocks. The first video time line illustrates the same three sets of contiguous video blocks from FIG. 5a. On the second video time line illustrated in FIG. 5b the out point of video block C in the second contiguous video block has been extended far past the in point of video block D. The third video time line of FIG. 5b illustrates how the Domino re-edit in system attempts to reconcile the inconsistent time line created by the re-edit in the second video time line. In the third video time line of FIG. 5b, video blocks D and E are moved over to the right. However, since there was insufficient empty space between the second contiguous video block and the third contiguous video block, an overlap exists between video block E in the second contiguous video block and video block F in the third contiguous video block. The re-edit system of the present invention recognizes and handles the overlap problem.

In one embodiment, the present invention displays a pop-up dialog box which explains the overlap problem to the user. The system asks the user whether the re-edit should aborted or whether the system should move the third set of contiguous video blocks forward in time.

In a second embodiment, the present invention uses a set of predefined user preferences to handle the overlap problem. For example, the user may specify that the system always abort any re-edit which causes an overlap problem.

Domino Re-Edits With Absolute Locks

Generally, the Domino re-edit function moves video blocks as necessary to reconcile re-edits. In certain situations a user may require that a particular video block remain at a particular position on the time line. For example, when an operator uses the present invention to edit a music video, the operator may want to synchronize certain video blocks with the audio track. To accommodate such situations, the present invention provides a method of "locking" video blocks to a time line. When a video block is locked to the time line, the Domino re-edit function will not ever move the locked video block when reconciling a re-edit.

Figure 6:
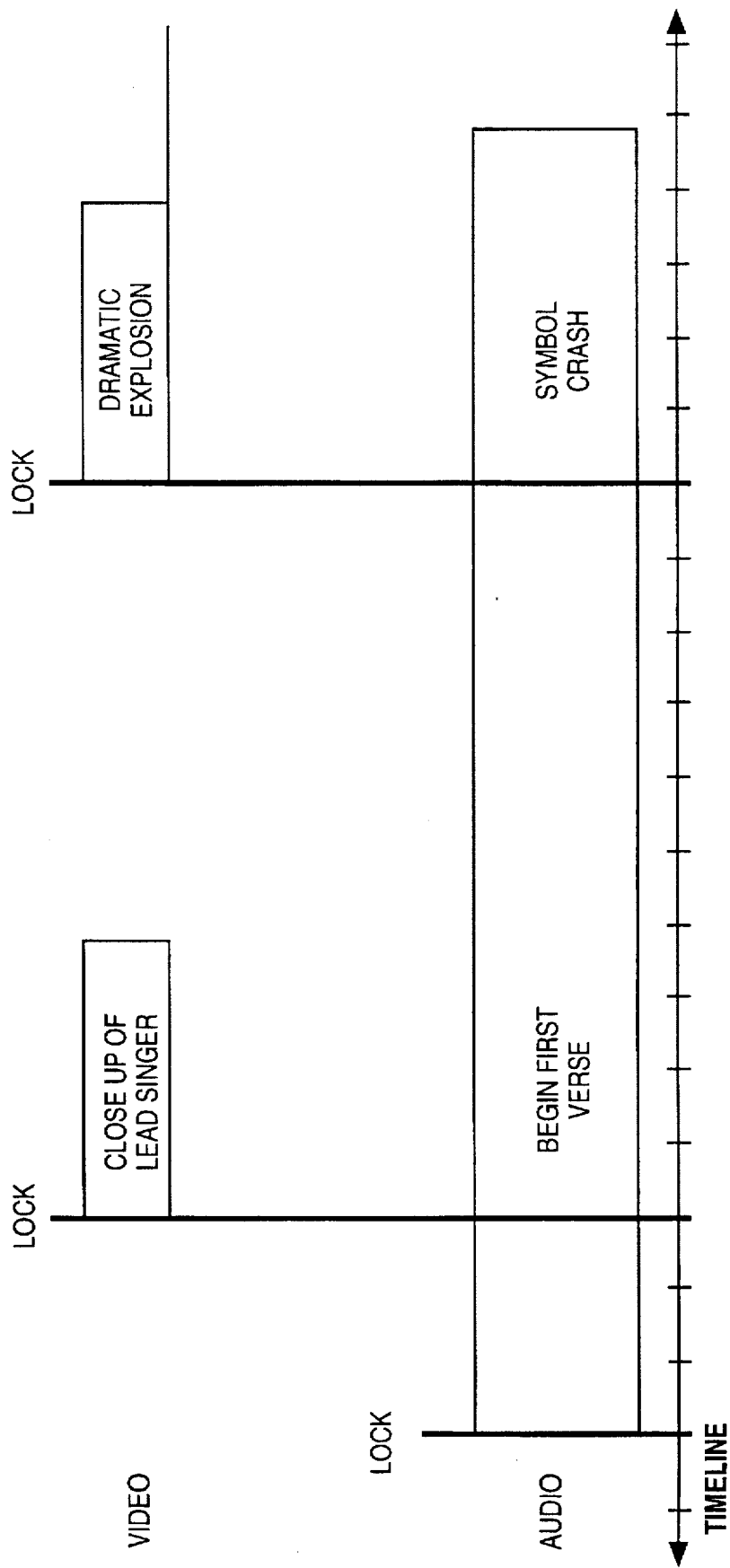
FIG. 6 illustrates a typical use of locking a video block to a reference time line.

Referring to FIG. 6 a typical use of locked video blocks is illustrated. At the bottom of FIG. 6 a time line is illustrated. The time line provides a time reference upon which the media tracks are placed. Above the reference time line is an audio track which has been laid on the time line. In the example illustrated in FIG. 6, the audio track comprises the song for which a music video is being created. The audio track has been locked to the reference time line such that song will not move. Near the beginning of the song, the first verse of the song begins. A block of video containing shots of the lead singer singing the first verse of the song has been placed at the point where the first verse of the song begins such that the video block of the singer is synchronized with the song. The video block of the singer is then locked to the reference time line such that the video block will not be affected by any further edits. Similarly, near the end of the song at point y is a loud cymbal crash. To complement the loud cymbal crash at point y, the video director has locked a video block containing a dramatic explosion. The locked dramatic explosion video block also will not be affected by any further re-edits.

Figure 7:
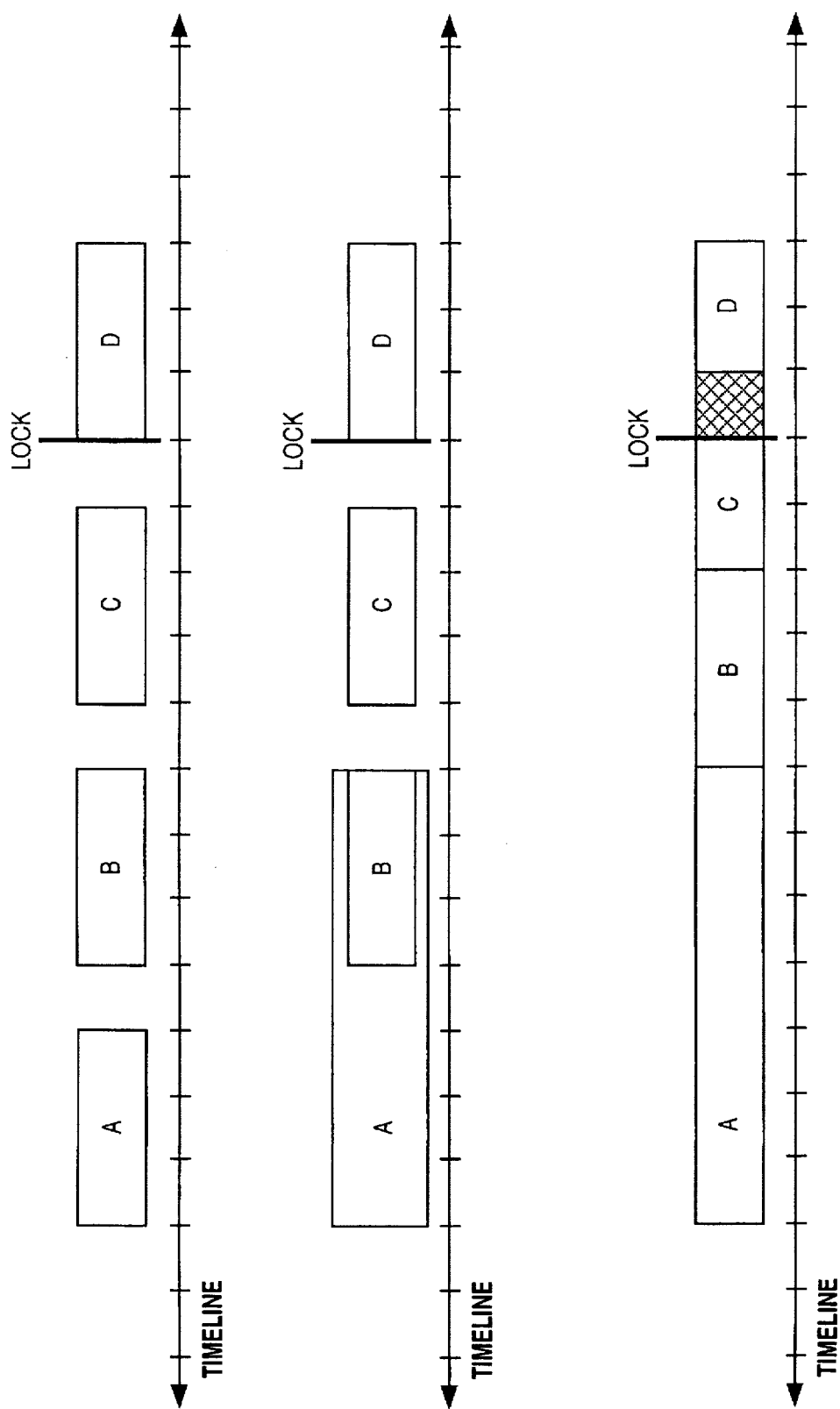
FIG. 7 illustrates the reconciliation of a re-edit by the Domino function when a video block has been locked to the reference time line and the re-edit cannot be performed since the locked video block will not move.

FIG. 7 illustrates a first example of a re-edit performed on an edited video containing a video block that is locked to the time line. The first video time line illustrated in FIG. 7 has four video blocks A, B, C, and D. The fourth video block, video block D, is locked to the reference time line to prevent video block D from moving. In the second video time line illustrated in FIG. 7, the out point of video block A has been extended past the in point of video block B such that the re-edit system must reconcile the time line. The third video time line of FIG. 7 illustrates how the system reconciles the inconsistent time line. In the third video time line of FIG. 7, the system has moved video blocks B and C to the right after extended video block A. The system does not move Video block D since Video block D has been locked to the reference time line. Since there was not enough empty space between the video blocks, video block C overlaps locked video block D. The re-edit system of the present invention recognizes and handles the overlap problem.

In one embodiment, the present invention displays a pop-up dialog box which explains the overlap problem to the user. The dialog box requests the user whether the system should abort the re-edit or move locked video block D forward in time to accommodate the edit.

In a second embodiment, the present invention uses a set of predefined user preferences to handle the overlap problem. For example, the user may specify that the system always abort any re-edit which causes an overlap problem.

Domino Re-Edits With Relative Locks

An operator editing a video often does not know exactly where on a reference time line a particular video block should be placed. However, the operator may know other information such as the relative relationships between different video shots. The concept of a "locked" video block can be used to lock various relationships between shots.

Figure 8A:
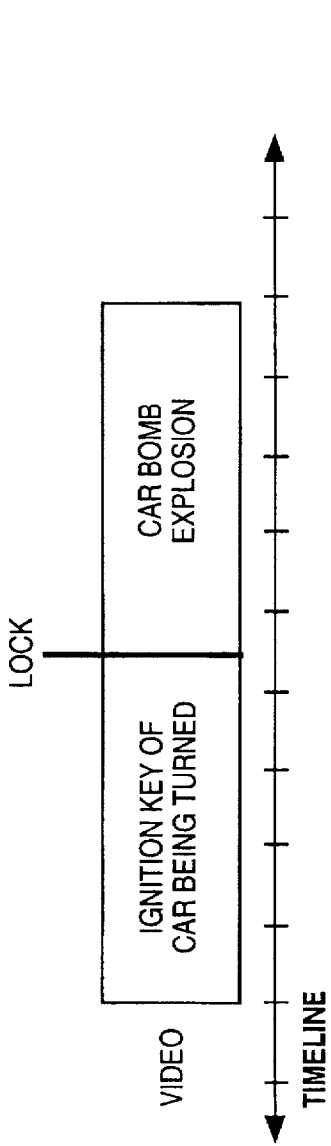
FIG. 8a illustrates the use of a relative lock connecting two adjacent video blocks.

For example, in a movie containing a car bomb explosion an operator may want to have a scene of the ignition key being turned immediately followed by an explosion. To permanently lock this relationship between these two video shots, a user of the present invention can place a "relative lock" connecting these two video shots together as illustrated in FIG. 8a.

Figure 8B:
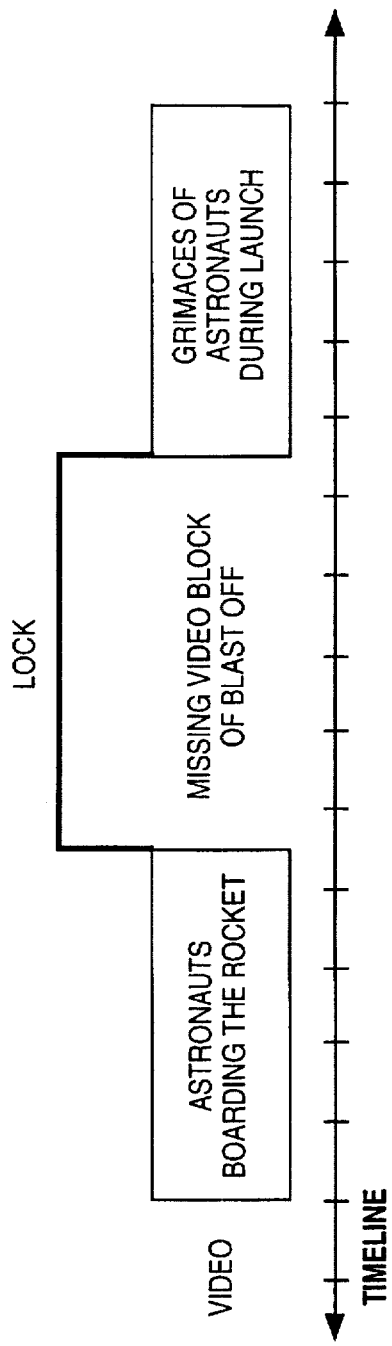
FIG. 8b illustrates a use of a relative lock connecting two video blocks together while reserving space between the video blocks.

Re-editing a video with missing material provides another good example of a use for a relative lock. FIG. 8b illustrates an edited video without all the required video source material. The video begins with a video block of astronauts boarding a rocket. The next scene should contain a special effects sequence of the rocket blasting off. However, the blast off scene has not yet been taped so there is an empty gap in the edited video. After the blast off scene is a video block of the astronauts grimacing and sweating during the rocket launch. To reserve space on the time line for the blast off scene, a relative lock connecting the first video block to the second video block with an empty space in-between has been added.

Figure 9:
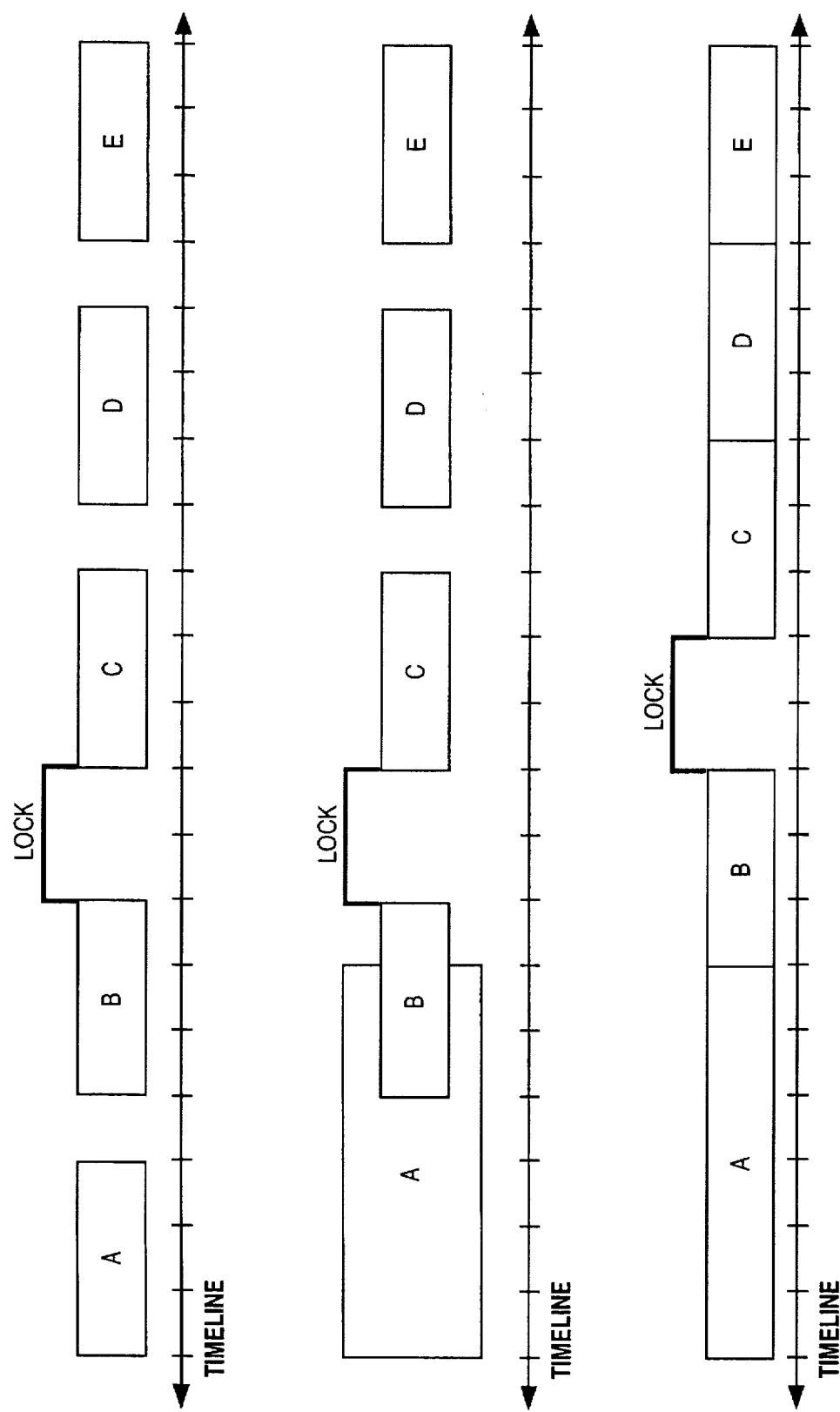
FIG. 9 illustrates the reconciliation of a re-edit by the Domino function when two video blocks have been locked reserving space between the video blocks such that the Domino re-edit maintains the space between the two locked video blocks.

The re-edit system of the present invention honors the relative locks by always keeping the locked video blocks in the locked relative relationship even though the locked video blocks may move along the reference time line. FIG. 9 illustrates an example of this effect.

FIG. 9 illustrates an example of a re-edit performed on an edited video that has two video blocks locked to one another in a relative relationship. The first video time line illustrated in FIG. 9 has five video blocks A, B, C, D, and E. The second and third video blocks, video blocks B and C, are locked together in a relative relationship with empty space between the two video blocks similar to the video blocks illustrated in FIG. 8b. In the second video time line illustrated in FIG. 9, the out point of video block A has been extended past the in point of video block B such that the system must reconcile the time line. The third video time line of FIG. 9 illustrates how the system reconciles the inconsistent video time line which contains a relative lock. In the third video time line of FIG. 9, the system has moved video blocks B, C, D, and E forward in time after extended video block A. The system moves locked video blocks B and C as a single unit such that the space between the two video blocks has been preserved.

Figure 10:
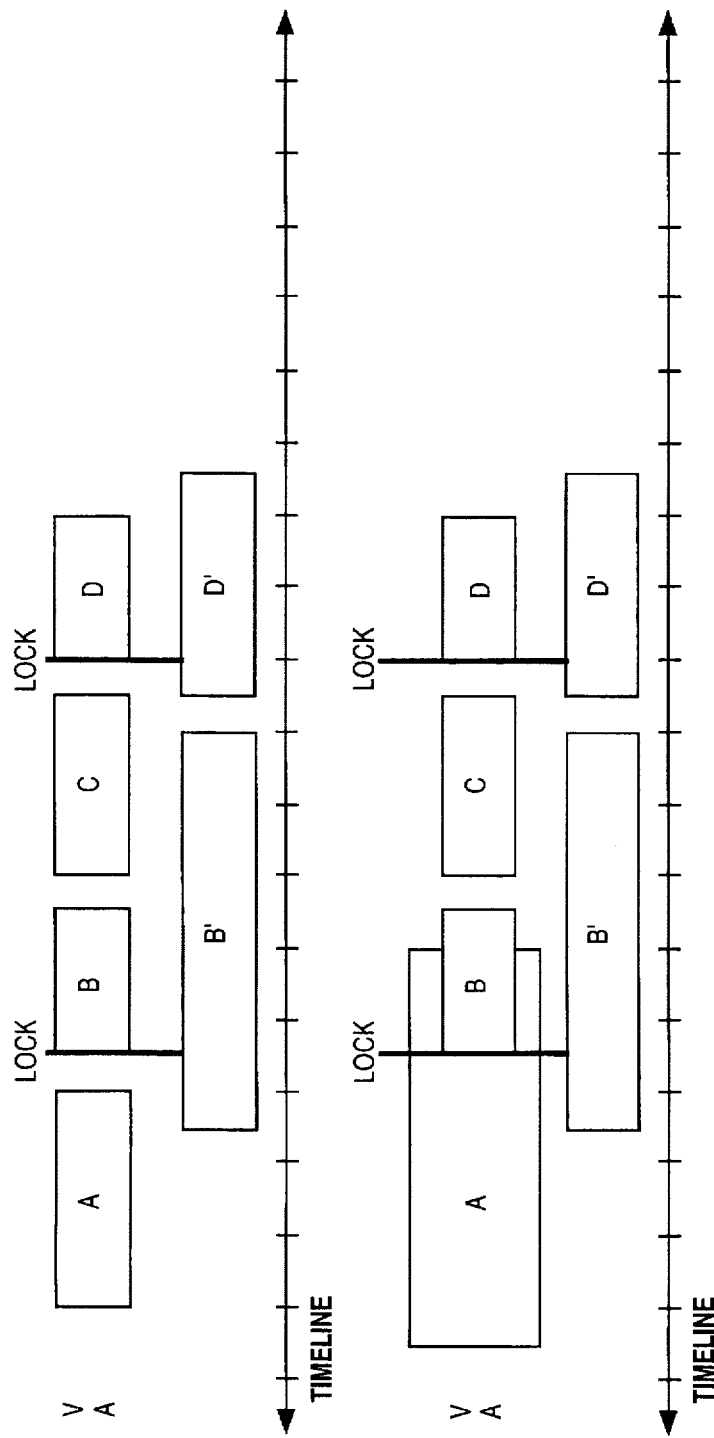
FIG. 10 illustrates the reconciliation of a re-edit by the Domino function when two video blocks have been locked to associated audio tracks.
Figure 10:
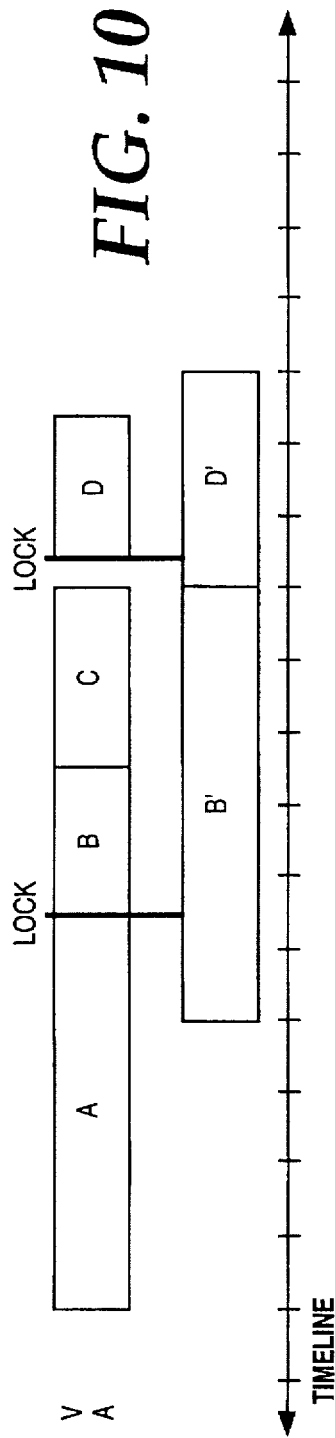

Relative locks can also be used to lock blocks of different media tracks together. FIG. 10 illustrates an example of a re-edit performed on an edited video with audio where two video blocks are locked to associated audio blocks. The first video time line illustrated in FIG. 10 has four video blocks A, B, C, and D. Video blocks B and D have associated audio blocks B' and D' which are locked to video blocks B and D respectively. In the second video time line illustrated in FIG. 10, the out point of video block A has been extended past the in point of video block B such that the system must reconcile the time line. The third video time line of FIG. 10 illustrates how the system reconciles the inconsistent video time line which contains locked audio blocks. In the third video time line of FIG. 10, the system has moved video blocks B and C after extended video block A. Audio block B' has also been moved such that its locked relationship with video block B is preserved. Audio block B' has pushed audio block D' to the right so that the two audio blocks don't overlap. Video block D which is locked to audio block D' has been moved to the right in order to preserve the locked relative relationship with audio block D'.

Bi-directional Domino Ripple

All of the examples provided in this Specification have only illustrated re-edits which extend the out point of a video block forward in time and which ripple video blocks forward in time. However, the system of the present invention works equally well when an in point of a video block is moved backward in time and causing the video blocks to ripple backward in time.

Figure 11:
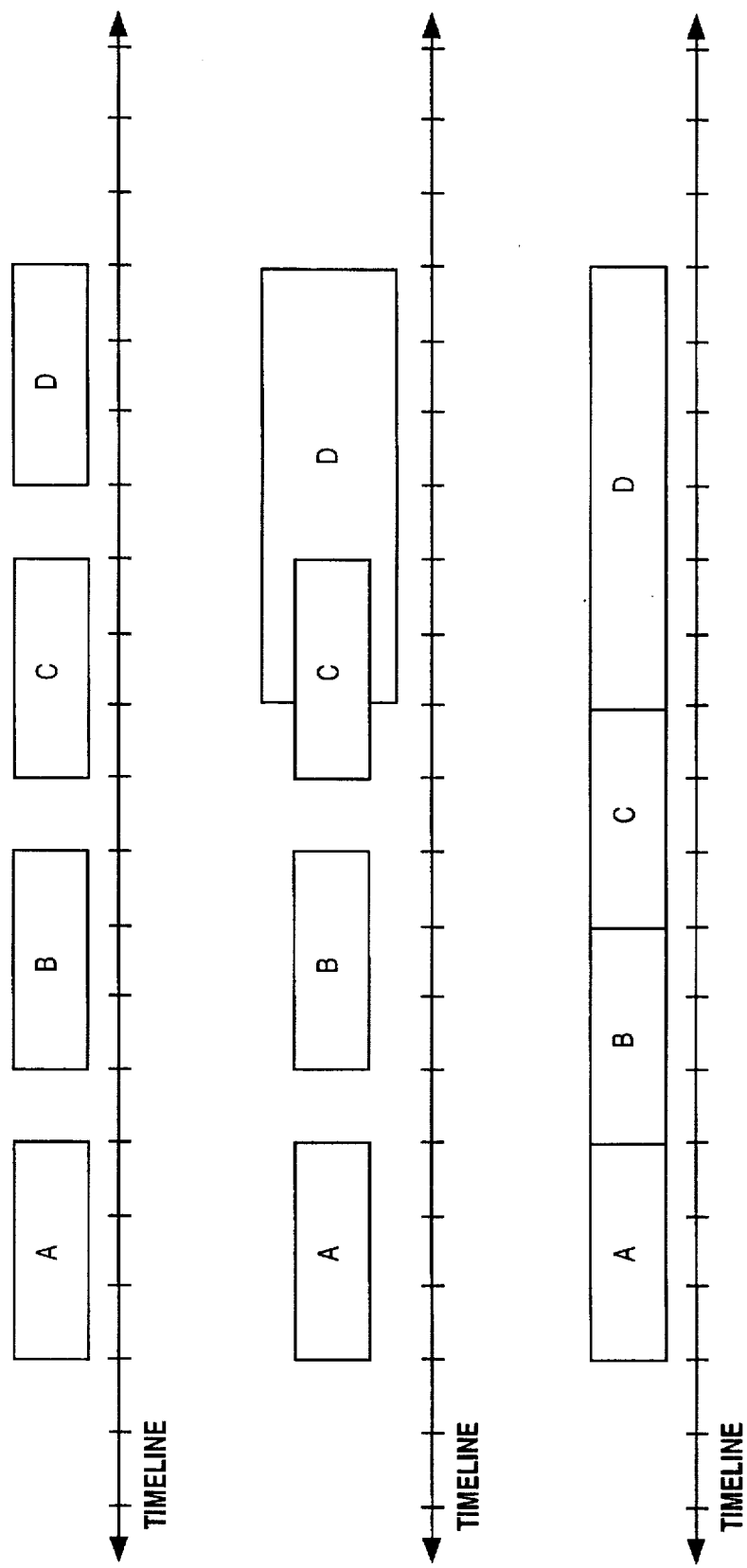
FIG. 11 illustrates a backward (descending in time) Domino ripple re-edit.

FIG. 11 illustrates an example of a re-edit which causes a backward ripple. The first video time line illustrated in FIG. 11 has four video blocks A, B, C, and D. In the second video time line illustrated in FIG. 11, the in point of video block D has been move backward in time to extend past the out point of video block C. The third video time line of FIG. 11 illustrates how the system reconciles the inconsistent video time line. In the third video time line of FIG. 11, the system has moved video blocks A, B, and C, backward in time in order to make room for the extended video block D. Thus the system rippled video blocks B and C backward in time.

Furthermore, the system of the present invention can be configured to ripple media blocks both forward and backward (or backward and forward) as necessary. A forward and backward ripple is necessary when just a forward ripple or backward ripple alone would not reconcile the inconsistent time line.

Figure 12:
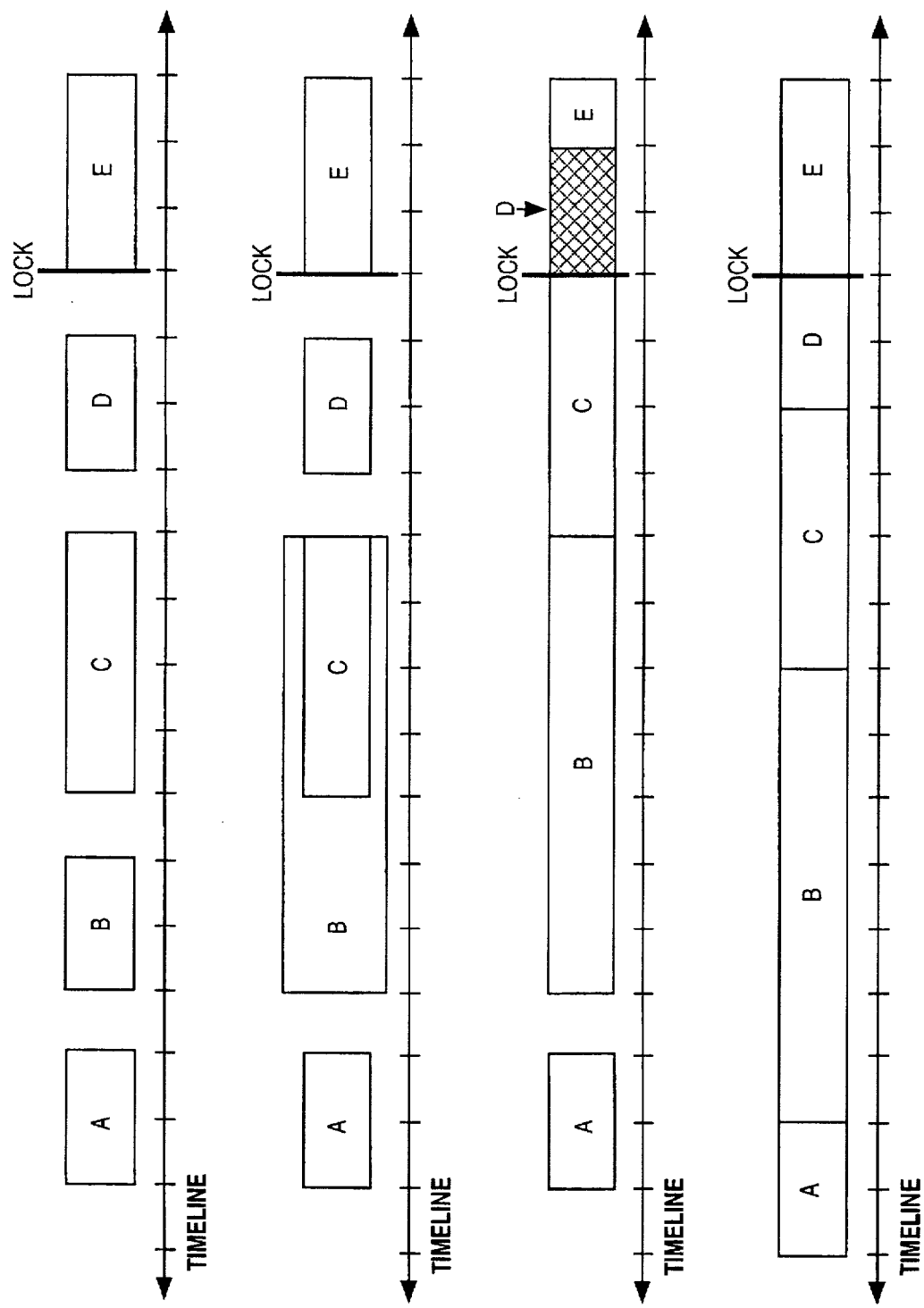
FIG. 12 illustrates a Domino ripple re-edit which requires both a forward and backward ripple.

FIG. 12 illustrates an example of a re-edit which causes both a forward and backward ripple. The first video time line illustrated in FIG. 10 has five video blocks A, B, C, D, and E. Video block E is locked to the reference time line to prevent it from moving. In the second video time line illustrated in FIG. 12, the out point of video block B has been extended past the in point of video block C such that the system must reconcile the time line. The third video time line of FIG. 12 illustrates a first pass made by the system when attempting to reconcile the inconsistent video time line by rippling the video blocks forward. In the third video time line of FIG. 12, the system has moved video blocks C and D after extended video block B. However, this has caused video block D to overlap video block E which is locked to the reference time line. The system then attempts to ripple backwards. In the fourth video time line of FIG. 12, the system has moved video blocks A, B, C and D backward in time such that video blocks D and E no longer overlap. Thus the system was able to reconcile the re-edit without affecting locked video block E by rippling video blocks forward in time and then backward in time.

If video block A in FIG. 12 was locked to the reference time line, the second backward ripple pass would have failed since the system have not been able to move video block A over to the left. In such a situation, the system can handle the problem in one of two ways. In a first embodiment of the present invention, the system handles such a problem by displaying a pop-up dialog box which explains the problem to the user. The dialog box would ask the user whether the edit should be aborted or whether video block A or E should be unlocked. In a second embodiment, the present invention uses a set of predefined user preferences to handle the problem. For example, the user may specify a set of preferences that cause the system to always abort any re-edit which does not fit within the existing gaps.

The Domino Delete Re-Edit Function

The "Domino" effect can also be used when a user performs a re-edit which shortens the duration of video block. In such a situation, the system moves nearby video blocks over such that the space created by the shortened video block is filled.

Figure 13:
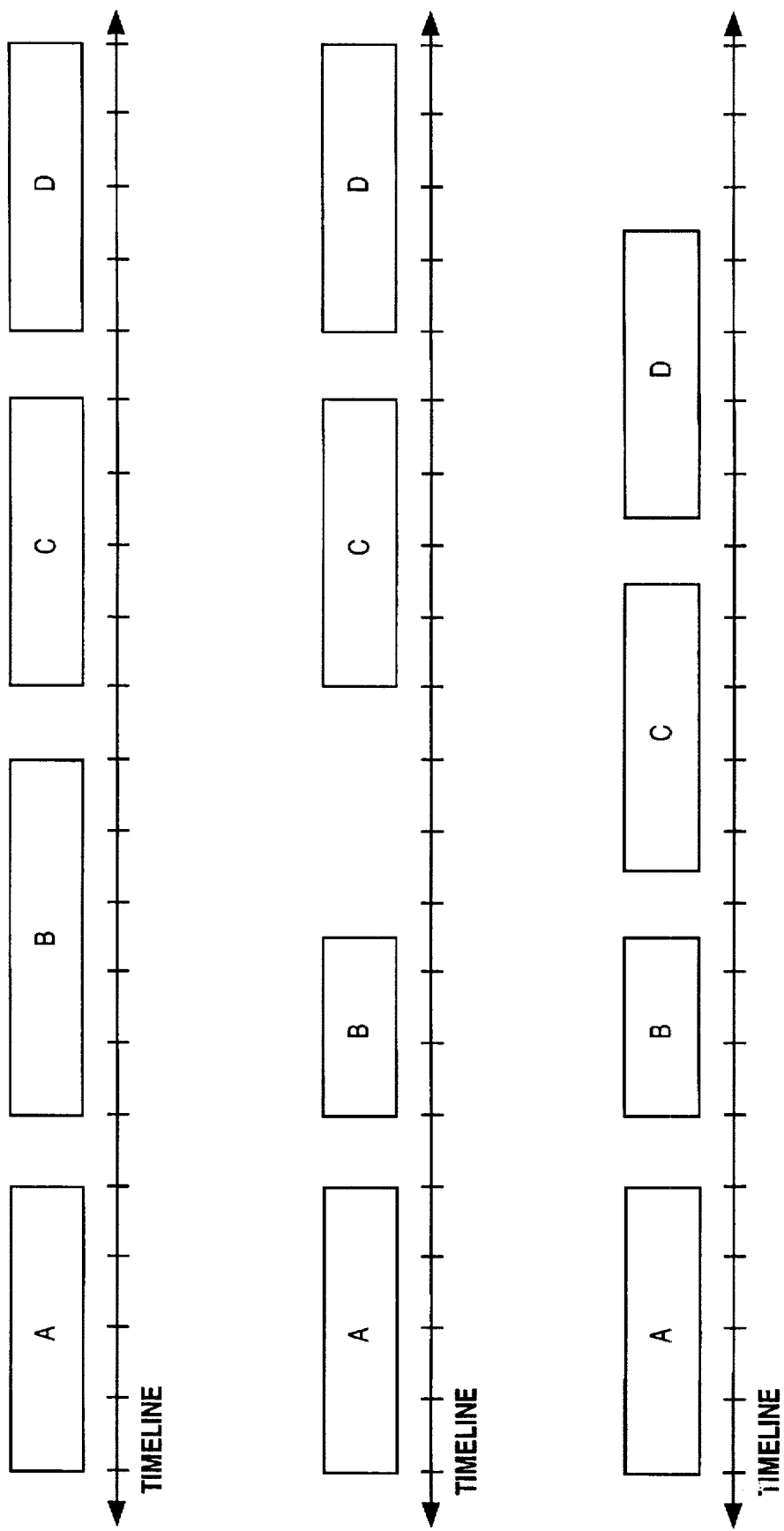
FIG. 13 illustrates an example of a re-edit which shortens the duration of a video block.

FIG. 13 illustrates an example of a re-edit which shortens the duration of a video block. The first video time line illustrated in FIG. 13 has four video blocks A, B, C, and D. In the second video time line illustrated in FIG. 13, the out point of video block B has been moved backward in time such that video block B now has a shorter duration. By shortening video block B extra space has been created between video blocks B and C. The third video time line of FIG. 13 illustrates how the system adjusts the remaining video blocks in order to fill in the extra space created by shortened video block B. In the third video time line of FIG. 13, the system has moved video blocks C and D backward in time after shortened video block B. The system preserves the empty spaces that existed before video block B was shortened.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer controlled multi-media re-editing system, a method of re-editing a multi-media work, said multi-media work comprising at least one media track laid on a reference time line, said media track comprising a plurality of media blocks laid on said reference time line, each of said media blocks comprising an in point and an out point, said media track having gaps between said media blocks, said method comprising the steps of:

extending a first media block in a first direction such that a duration of said first media block is increased, said extended first media block overlapping a second media block located next to said first media block in said first direction;

moving said second media block along said reference time line in said first direction such that said second media block is adjacent to said first media block and said second media block no longer overlaps said first media block; and moving additional media blocks next to said second media block along said reference time line in said first direction while filling in said gaps between said media blocks such that a duration of gaps filled equals the increase in duration of said first media block and no media blocks overlap wherein a third media block is locked to a fourth media block such that said step of moving additional media blocks moves said third and fourth media blocks as a single unit along said reference time line such that the relative relationship between said third and fourth media blocks is preserved.

2. The method as in claim 1 wherein said second media block is immediately adjacent to said first media block and said step of moving additional media block only moves adjacent media blocks that form a contiguous set of media blocks.

3. The method as in claim 1 wherein said media blocks can be locked to said reference time line such that either said step of moving media blocks is aborted if either step attempts to move a locked media block.

4. The method as in claim 3 wherein said media blocks can be locked to said reference time line such that if either step of moving media blocks fails due to a locked media block then said system attempts to move said first, second, and additional media blocks in a second direction opposite to said first direction.

5. The method as in claim 1 wherein said third media block and said fourth media block are from two different media tracks.

6. In a computer controlled multi-media re-editing system, a method of re-editing a multi-media work, said multi-media work comprising at least one media track laid on a reference time line, said media track comprising a plurality of media blocks laid on said reference time line, each of said media blocks comprising an in point and an out point, said method comprising the steps of:

extending a first media block in a first direction such that a duration of said first media block is increased, said extended first media block overlapping a second media block located next to said first media block in said first direction;

moving said second media block along said reference time line in said first direction such that said second media block is adjacent to said first media block and said second media block no longer overlaps said first media block; and moving additional media blocks next to said second media block along said reference time line in said first direction while filling in said gaps between said media blocks such that a duration of gaps filled equals the increase in duration of said first media block and no media blocks overlap wherein said step of moving additional media blocks moves only adjacent media blocks that form a contiguous set of media blocks having no gaps between said adjacent media blocks.

7. The method as in claim 6 wherein said media blocks can be locked to said reference time line such that either said step of moving media blocks is aborted if either step attempts to move a locked media block.

8. The method as in claim 7 wherein said media blocks can be locked to said reference time line such that if either step of moving media blocks fails due to a locked media block then said system attempts to move said first, second, and additional media blocks in a second direction opposite to said first direction.

9. The method as in claim 8 wherein said additional media blocks are from two different media tracks.

10. A computer controlled multi-media re-editing apparatus for re-editing a multi-media work, said multi-media work comprising at least one media track laid on a reference time line, said media track comprising a plurality of media blocks laid on said reference time line, each of said media blocks comprising an in point and an out point, said media track having gaps between said media blocks, said apparatus comprising the elements of:

means for extending a first media block in a first direction such that a duration of said first media block is increased, said extended first media block overlapping a second media block located next to said first media block;

means for moving said second media block along said reference time line in said first direction such that said second media block is adjacent to said first media block and no longer overlaps said first media block; and means for moving additional media blocks along said reference time line in said first direction while filling in said gaps between said media blocks such that a duration of gaps filled equals the increase in duration of said first media block and no media blocks overlap wherein a third media block is locked to a fourth media block such that said step of moving additional media blocks moves said third and fourth media blocks as a single unit along said reference time line such that the relative relationship between said third and fourth media blocks is preserved.

11. The apparatus as in claim 10 wherein said second media block is immediately adjacent to said first media block and said means for moving additional media block only moves adjacent media blocks that form a contiguous set of media blocks.

12. The apparatus as in claim 10 wherein said media blocks can be locked to said reference time line to restrict movement by said means for moving second media block and means for moving additional media blocks.

13. The apparatus as in claim 12 wherein said means for moving second media block or means for moving additional media blocks attempts to move said second or additional media blocks in a second direction opposite to said first direction when said means for moving second media block or means for moving additional media blocks fails to move a locked media block.

14. The apparatus as in claim 10 wherein said third media block and said fourth media block are from two different media tracks.

15. A computer controlled multi-media re-editing apparatus for re-editing a multi-media work, said multi-media work comprising at least one media track laid on a reference time line, said media track comprising a plurality of media blocks laid on said reference time line, each of said media blocks comprising an in point and an out point, said apparatus comprising the elements of:

means for extending a first media block in a first direction such that a duration of said first media block is increased, said extended first media block overlapping a second media block located next to said first media block;

means for moving said second media block along said reference time line in said first direction such that said second media block is adjacent to said first media block and no longer overlaps said first media block; and means for moving additional media blocks along said reference time line in said first direction while filling in said gaps between said media blocks such that a duration of gaps filled equals the increase in duration of said first media block and no media blocks overlap wherein said means for moving additional media blocks moves only adjacent media blocks on said reference time line that form a contiguous set of media blocks having no gaps between said adjacent media blocks.

16. The apparatus as in claim 15 said media blocks can be locked to said reference time line to restrict movement by said means for moving second media block and means for moving additional media blocks.

17. The apparatus as in claim 16 wherein said means for moving second media block or means for moving additional media blocks attempts to move said second or additional media blocks in a second direction opposite to said first direction when said means for moving second media block or means for moving additional media blocks fails to move a locked media block.

18. The apparatus as in claim 15 wherein said additional media blocks are from two different media tracks.

\* \* \* \* \*